United States Patent Office 3,330,643
Patented July 11, 1967

3,330,643
HERBICIDAL COMPOSITION AND METHOD
Marion W. Harman and John J. D'Amico, both of Dunbar, W. Va., assignors to Monsanto Company, St. Louis, Mo., a corporation of Delaware
No Drawing. Application June 25, 1965, Ser. No. 467,085, which is a continuation of applications Ser. No. 642,924 and Ser. No. 642,948, Feb. 28, 1957, and Ser. No. 853,988, Nov. 19, 1959. Divided and this application Sept. 9, 1965, Ser. No. 510,446
Claims priority, application Sweden, May 6, 1959, 4,396/59
33 Claims. (Cl. 71—100)

This application is a division of application Ser. No. 467,085, filed June 25, 1965, which is a continuation of applications Ser. No. 642,924, filed Feb. 28, 1957, Ser. No. 642,948, filed Feb. 28, 1957, and Ser. No. 853,988, filed Nov. 19, 1959, all now abandoned.

This invention relates to new esters of thiolcarbamic acids and to methods for their preparation. These compounds possess biological activity and have other uses hereinafter illustrated. The invention includes methods of destroying or controlling undesired vegetation, fungi, and nematodes and relates to biologically active compositions useful for such purposes. More particularly it relates to methods of destroying or controlling undesired vegetation and other pests which comprises applying thereto an effective concentration of a toxic ester of a thiolcarbamic acid.

General objects of the invention are to provide esters of thiolcarbamic acids, methods for preparing them, and to provide compositions which are toxic to living plants, nematodes, fungi, or other pests or combinations thereof, and to provide methods for their use to accomplish various desirable ends. A further general object is to provide compositions and methods for the destruction of noxious vegetation. Another object is to provide defoliating compositions. Another object is to destroy noxious vegetation either in the form of germinating seeds or by application of the toxicant to the foliage after emergence. Still another object is to provide methods for destroying nematodes. A particular object of the invention is to provide outstanding grass-specific pre-emergence herbicides and methods for using them. A further particular object is to provide methods for the destruction or control of grasses by applying the toxicant to the foliage and to provide compositions for such purpose. Still another particular object is to provide methods for the destruction or control of broadleaved plants and to provide herbicidal compositions for such purposes. A further particular object is to provide compositions which not only are toxic to plants but destroy or control fungi. Other and further objects will be apparent from the detailed description which follows.

The compounds conform to the structure

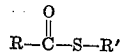

where R is an organic amino substituent having the nitrogen atom connected directly to the carbon of the

and to two other carbon atoms and where R' represents a non-aromatic unsaturated radical. By non aromatic is meant that a carbon atom which is part of an aromatic ring is not connected directly to the sulfur. The valences of the amino substituent represented by R are preferably satisfied by lower alkyl groups but if the chain is interrupted by oxygen or sulfur, compounds having higher molecular weights maintain high biological activity. Moreover, heterocyclic amino substituents are especially efficacious. The unsaturated group represented by R' is preferably an alkenyl group either unsubstituted or substituted by halogen although the presence of halogen serves significantly to support the biological activity. Typical examples of R' comprise cis- and trans-2,3-dichloro-2-butenyl, 3-chloro-2-butenyl, 2-chloroallyl, 2-bromoallyl, 3-chloroallyl, cis- and trans-2,3-dichloroallyl, 3-iodoallyl, 3-iodo-2-butenyl, 2,3-diodo-2-butenyl, 2-fluoro-3-chloroallyl, vinyl, allyl, 2-butenyl, 4-chloro-2-butenyl, 2-iodoallyl, 3-bromoallyl, and 2,3-dibromoallyl.

Cyclohexenyl esters are desirable but aromatic and saturated esters are not included.

Several methods are available for the preparation of thiolcarbamate esters. The halide corresponding to the desired ester is condensed with an alkali metal thiocarbamate in one method. The alkali metal thiolcarbamates are available from reaction of carbonoxysulfide with amines in the presence of alkali. In another method a thionocarbamate ester is rearranged to a thiol ester by reaction with an alkyl halide. The rearrangement is accompanied by trans esterification. Still another method is to condense a carbonyl halide with a mercaptan or mercaptide.

*Example 1*

A solution comprising 180 grams (1.0 mole) of 25% dimethylamine, 160 grams (1.0 mole) of 25% sodium hydroxide and 1000 ml. of water was prepared and carbonoxysulfide then bubbled in at 0°–5° C. for 25 minutes or until there was a gain in weight of 60.1 grams (1.0 mole). The reaction mixture was stirred at 0°–10° C. for on half hour longer and the sodium dimethylthiolcarbamate obtained as a 9.16% solution.

To 347.5 grams (0.25 mole) of the sodium dimethylthiolcarbamate solution so prepared there was added with stirring 36.2 grams (0.25 mole) of cis- and trans-1,2,3-trichloro-1-propene, the stirring continued at 25°–30° C. for 24 hours, then the mixture heated at 50°–60° C. for 3 hours. After cooling to 20° C. the reaction mixture was extracted with 300 ml. of ethyl ether, the ether solution washed with water until the washings were neutral to litmus, dried over sodium sulfate and the ether removed in vacuo at a maximum temperature of 80°–90° C./1–2 mm. The cis- and trans-2,3-dichloroallyl dimethylthiolcarbamate, an amber oil, was obtained in 65% theory yield. Analysis gave 33.02% chlorine as compared to 33.11% calculated for $C_6H_9Cl_2NOS$.

*Example 2*

Employing a quantity of the same sodium dimethylthiolcarbamate solution in the same proportion and under the same reaction conditions but replacing the cis- and trans-1,2,3-trichloro-1-propene by 19.1 grams (0.25 mole) of allyl chloride, allyl dimethylthiolcarbamate was obtained as an amber oil in 60.6% yield. Analysis gave 9.50% nitrogen and 22.30% sulfur as compared to 9.65% nitrogen and 22.07% sulfur calculated for $C_6H_{11}NOS$.

*Example 3*

In the procedure of Example 1 and utilizing another portion of the same alkali metal thiolcarbamate, 27.8 grams (0.25 mole) of 2,3-dichloro-1-propene was substituted for the cis- and trans-1,2,3-trichloro-1-propene. The 2-chloroallyl dimethylthiolcarbamate was obtained as an amber oil, B.P. 112°–114° C./4 mm. Analysis gave 7.35% nitrogen and 18.11% sulfur as compared to 7.80% nitrogen and 17.84% sulfur calculated for $C_6H_{10}ClNOS$.

The same compound was prepared from ethyl dimethylthionocarbamate. To 133.2 grams (1.0 mole) of ethyl dimethylthionocarbamate was added with stirring 150 grams (1.35 moles) of 2,3-dichloro-1-propene. The stirred reaction mixture was heated at 110°–115° C. for 48 hours and then distilled to yield 2-chloroallyl dimethylthiolcarbamate, B.P. 112°–113° C./4 mm., in 46.9% yield. Analysis gave 7.78% nitrogen and 17.68% sulfur as compared to 7.80% nitrogen and 17.84% sulfur calculated for $C_6H_{10}ClNOS$.

Example 4

To a stirred solution comprising 180 grams (1.0 mole) of 25% dimethylamine, 160 grams (1.0 mole) of 25% sodium hydroxide and 1000 ml. of water there was bubbled in carbonoxysulfide at 0°–5° C. until there was a gain in weight of 75 grams (1.25 moles). The solution was stirred for an additional hour at room temperature and to this solution 145.3 grams (1.0 mole) of 1,1,3-trichloro-1-propene was added in one portion. Stirring was continued for 24 hours at room temperature and the reaction mixture extracted with 500 ml. of ethyl ether. The ether solution was washed with water until neutral to litmus, dried over sodium sulfate, and the ether removed in vacuo. Distillation of the reaction mixture under 4 mm. pressure gave an amber oil, B.P. 138°–140° C. The 3,3-dichloroallyl dimethylthiolcarbamate so obtained analyzed 6.54% nitrogen and 14.45% sulfur as compared to 6.54% nitrogen and 14.98% sulfur calculated for $C_6H_9Cl_2NOS$.

Example 5

A 12.7% aqueous solution of sodium diethylthiolcarbamate was prepared by mixing 146.3 grams (2.0 moles) of diethylamine, 320 grams (2.0 moles) of 25% sodium hydroxide and 2000 ml. of water. To this solution, with stirring at 0° C., there was bubbled in carbonoxysulfide until the gain in weight was 146 grams. The solution was stirred for an additional 2 hours at 0°–5° C.

To 412.5 grams (0.33 mole) of the sodium diethylthiolcarbamate solution so prepared there was added in one portion with stirring 36.4 grams (0.25 mole) of 1,1,3-trichloro-1-propene. The stirred mixture was heated at 50°–60° C. for 3 hours and then maintained at 25°–30° C. for 12 hours. The product was extracted with 300 ml. of ethyl ether, the ether solution washed with water until neutral to litmus, and dried over sodium sulfate. The ether was removed in vacuo at a maximum temperature of 80°–90° C./1–2 mm. The 3,3-dichloroallyl diethylthiolcarbamate so obtained was an amber oil. Analysis gave 5.79% nitrogen, 13.25% sulfur and 29.95% chlorine as compared to 5.78% nitrogen, 13.24% sulfur and 29.28% chlorine calculated for $C_8H_{13}Cl_2NOS$.

Employing a quantity of the same sodium diethylthiolcarbamate as prepared in Example 5 and proceeding as in Example 5, the following compounds were prepared:

Example 6

Cis- and trans-2,3-dichloroallyl diethylthiolcarbamate was obtained in 84.5% yield from cis- and trans-1,2,3-trichloropropene. The product was an amber oil analyzing 5.59% nitrogen, 13.05% sulfur, and 29.61% chlorine as compared to 5.78% nitrogen, 13.20% sulfur, and 29.20% chlorine calculated for $C_8H_{13}Cl_2NOS$.

Example 7

Allyl diethylthiolcarbamate was obtained in 95% yield from allyl chloride. The product was an amber oil analyzing 8.03% nitrogen and 18.43% sulfur as compared to 8.08% nitrogen and 18.50% sulfur calculated for $C_8H_{15}NOS$.

Example 8

2-bromoallyl diethylthiolcarbamate was obtained in 89% yield from 2,3-dibromo-1-propene. The product was an amber oil analyzing 5.43% nitrogen and 31.40% bromine as compared to 5.54% nitrogen and 31.65% bromine calculated for $C_8H_{14}BrNOS$.

Example 9

2-chloroallyl diethylthiolcarbamate was obtained in 83% yield from 2,3-dichloro-1-propene. The product was an amber oil analyzing 6.94% nitrogen and 15.78% sulfur as compared to 6.74% nitrogen and 15.44% sulfur calculated for $C_8H_{14}ClNOS$.

Example 10

To a stirred solution of 202.4 grams (2.0 moles) of di-n-propylamine in 1000 ml. of dry ethyl ether at −10° to 0° C. there was bubbled in carbonoxysulfide until the gain in weight was 120 grams. This addition required 30 minutes and the mixture was then stirred at −10° to 0° C. for an additional 90 minutes. Thereupon 111 grams (1.0 mole) of 2,3-dichloro-1-propene was added in one portion and the reaction mixture stirred at 25°–30° C. for 24 hours. The by-product salt was removed by filtration and the excess ether removed in vacuo. The residue was distilled in vacuo and the fraction boiling at 148°–149° C./8 mm. collected. The 2-chloroallyl di-n-propylthiolcarbamate was an amber liquid analyzing 5.63% nitrogen as compared to 5.94% calculated for $C_{10}H_{18}ClNOS$.

Example 11

In the procedure of Example 10, 139 grams (1.38 moles) of di-n-propylamine in 500 ml. of dry ether, 90 grams (1.5 moles) of carbonoxysulfide and 53 grams (0.69 mole) of allyl chloride were employed as reactants. The allyl di-n-propylthiolcarbamate, B.P. 130°–132° C./12 mm., was obtained in 52.7% yield analyzing 6.68% nitrogen as compared to 6.69% calculated for $C_{10}H_{19}NOS$.

Example 12

To a stirred solution of 202.4 grams (2.0 moles) of diisopropylamine in 1000 ml. of dry ethyl ether at −10° to 0° C. there was bubbled in carbonoxysulfide until the gain in weight was 120 grams. This addition required 30 minutes and the mixture was then stirred at −10° C. to 0° C. for an additional 90 minutes. Thereupon 145.4 grams (1.0 mole) of 1,2,3-trichloropropene was added in one portion and the reaction mixture stirred at 25°–30° C. for 24 hours. The by-product salt was removed by filtration and the excess ether removed in vacuo. The residue was distilled in vacuo and the fraction boiling at 145°–159° C./9 mm. collected. The cis- and trans-2,3-dichloroallyl diisopropylthiolcarbamate was an amber liquid analyzing 11.83% sulfur as compared to 11.87% calculated for $C_{10}H_{17}Cl_2NOS$.

The same product was readily prepared in aqueous medium by bubbling 76.5 grams (1.1 moles) of 85% carbonoxysulfide into a mixture of 105 grams of 97% diisopropylamine, 200 ml. of water and 160 grams of 25% sodium hydroxide at 2°–6° C. There was then added 145.5 grams of 1,2,3-trichloropropene in one portion. The temperature was kept below 12° C. for about an hour by cooling with an ice bath. The ice bath was then removed. The temperature rose slowly to 30° C. in 4 hours. 400 ml. of water was added, the organic layer separated, washed with water and stipped at 95°–100° C./14 mm. The residue was then distilled, collecting the fraction boiling at 118°–119° C./1 mm.

Example 13

Employing 196 grams (2.0 moles) of diallylamine in 1000 ml. of ether, 77 grams (1.29 moles) of carbonoxysulfide and 111 grams (1.0 mole) of 2,3-dichloro-1-propene and following the procedure of Example 10, 2-chloroallyl diallylthiolcarbamate, B.P. 142°–143° C./9 mm., was obtained as an amber liquid. Analysis gave 5.86% nitrogen as compared to 6.04% calculated for $C_{10}H_{14}ClNOS$

Example 14

Trans-2,3-dichloroallyl diisopropylthiolcarbamate was prepared by the following procedure: To a solution of 56.5 grams (0.5 mole) of 88% diisopropylamine, 100 ml. of water and 80 grams of 25% sodium hydroxide at 0°–5° C. was added 38 grams (0.55 mole) of 85% carbonoxysulfide. This was followed by adding dropwise at 0°–5° C. 72.7 grams (0.5 mole) of trans-1,2,3-trichloropropene, B.P. 134°–135° C. Stirring was continued 1 hour at 0° C. and then over a period of 4 hours the temperature was raised to 27° C. Water, 200 ml., was added, the organic layer separated, washed with water and stripped at 100° C./14 mm. The pure ester distilled at 160°–161° C. at 10 mm. Hg.

*Example 15*

Substituting cis-1,2,3-trichloropropene, B.P. 148.5° C., in the foregoing procedure yielded cis-2,3-dichloroallyl diisopropylthiolcarbamate as a yellow oil, B.P. 164.5°–165° C./10 mm., M.P. 38°–40° C.

*Example 16*

To a cold stirred solution of 33.4 grams (0.25 mole) of 2-chloro-N-isopropylallylamine and 40 grams (0.25 mole) of 25% sodium hydroxide in 50 ml. of water there was bubbled in at 5°–10° C. carbonoxysulfide until the gain in weight was 19.5 grams. After this addition, which required an hour, there was added in one portion 36.2 grams (0.25 mole) of cis- and trans-1,2,3-trichloropropene. Stirring was continued for 5 hours at 25°–30° C. and the reaction mixture then extracted with 400 ml. of ethyl ether and filtered to remove by-product salt. The ether solution was washed with water until neutral to litmus, dried over sodium sulfate and the ether removed in vacuo at a maximum temperature of 80°–90° C./1–2 mm. The cis- and trans-2,3-dichloroallyl N-(2-chloroallyl) - isopropylthiolcarbamate so obtained was an amber liquid analyzing 4.3% nitrogen as compared to 4.6% calculated for $C_{10}H_{14}Cl_3NOS$.

*Example 17*

Substituting 33.3 grams (0.25 mole) of 2,2'-dimethoxy diethylamine for the 2-chloro-N-isopropylallylamine in the procedure of Example 14, cis- and trans-2,3-dichloroallyl bis-(2-methoxyethyl)thiolcarbamate was obtained as an amber liquid analyzing 4.2% nitrogen as compared to 4.6% calculated for $C_{10}H_{17}Cl_2NO_3S$.

*Example 18*

A solution comprising 21.5 grams (0.25 mole) of piperazine, 80 grams (.5 mole) of 25% sodium hydroxide and 50 ml. of water was prepared and 85% carbonoxysulfide then bubbled in at 5°–10° C. for approximately an hour or until the gain in weight was 39 grams. Thereupon there was added in one portion 72.5 grams (0.5 mole) of cis- and trans-1,2,3-trichloropropene and stirring continued for 5 hours at 25°–30° C. The reaction mixture was then diluted with 400 ml. of water, the solution extracted with 400 ml. of ethyl ether and the by-product salt removed by filtration. The ether solution was washed with water until neutral to litmus, dried over sodium sulfate and the ether removed in vacuo at a maximum temperature of 80°–90° C./1–2 mm. The bis(cis- and trans-2,3-dichloroallyl)-1,4-piperazinedicarbothiolate was an amber liquid analyzing 6.2% nitrogen as compared to 6.6% calculated for $C_{12}H_{14}Cl_4N_2O_2S_2$.

*Example 19*

To a stirred solution of 35.3 grams (0.25 mole) of N-ethylaniline, 50 ml. of ethyl alcohol and 16.5 grams (0.25 mole) of 85% potassium hydroxide at 0° C. there was bubbled in 19.5 grams (0.275 mole) 85% carbonoxysulfide. The addition was made at 0°–10° C. over about an hour. To the resulting slurry at 5° C. was added 36.3 grams (0.25 mole) of 1,2,3-trichloropropene in one portion. The reaction mixture was stirred at 0°–10° C. for half an hour and then at 25°–30° C. for 5 hours. After adding 300 ml. of water and 300 ml. of ethyl ether, the reaction mixture was stirred for 15 minutes, then the ether layer separated and washed with dilute hydrochloric acid until neutralization of the wash water gave no turbidity. The ether layer was then washed with water until neutral to litmus, dried over sodium sulfate and the ether removed in vacuo at a maximum temperature of 80°–90° C. at 1–2 mm. The product, 2,3-dichloroallyl N-ethylthiolcarbanilate, was an amber oil.

*Example 20*

To a stirred solution of 31.8 grams (0.25 mole) of N-ethylcyclohexylamine, 50 ml. of water and 40 grams (0.25 mole) of 25% sodium hydroxide at 0°–5° C. was added 19.5 grams (0.275 mole) of 85% carbonoxysulfide. There was then added in one portion 36.7 grams (0.25 mole) of 1,2,3-trichloropropene. Stirring was continued at 0°–5° C. for 1 hour and then over a period of 4 hours the temperature was raised to 30° C. The product was extracted with 400 ml. of ethyl ether, the ether solution washed with water until neutral to litmus and dried over sodium sulfate. The ether was removed in vacuro at a maximum temperature of 80°–90° C./1–2 mm. The cis- and trans-2,3-dichloroallyl N-ethyl-N-cyclohexylthiolcarbamate was an amber oil analyzing 4.53% nitrogen and 23.37% chlorine as compared to 4.73% nitrogen and 23.94% chlorine calculated for $C_{12}H_{19}Cl_2NOS$.

Other typical toxicants obtainable by similar procedures are recorded below. These are merely cited further to illustrate the invention and variations will be evident to those skilled in the art. For the most part, the products are amber oils. Cis- and trans-2,3-dichloroallyl N-butyl-N-cyclohexylthiolcarbamate, however, was an amber semi-solid. This compound was a selective crabgrass killer. Any of these compounds or mixtures thereof are effective when used as described to destroy or control undesired vegetation:

3-chloro-2-butenyl dimethylthiolcarbamate
3-chloro-2-butenyl diethylthiolcarbamate
3-chloroallyl diethylthiolcarbamate
3-chloroallyl dimethylthiolcarbamate
3-chloro-2-butenyl-4-morpholinecarbothioate
2-chloroallyl-4-morpholinecarbothioate
3-chloroallyl-4-morpholinecarbothioate
3-chloro-2-butenyl diallylthiolcarbamate
3-chloroallyl diallylthiolcarbamate
2-chloroallyl dibutylthiolcarbamate
3-chloroallyl dibutylthiolcarbamate
3-chloroallyl diisopropylthiolcarbamate
3-chloro-2-butenyl diisopropylthiolcarbamate
3-chloroallyl N-(β-cyanoethyl)-N-isopropylthiolcarbamate
3-chloro-2-butenyl dipropylthiolcarbamate
2-chloroallyl N-(allyl)isopropylthiolcarbamate
3-chloro-2-butenyl N-(allyl)isopropylthiolcarbamate
2-chloroallyl N-(2-chloroallyl)isopropylthiolcarbamate
3-chloroallyl N-(2-chloroallyl)isopropylthiolcarbamate
2-chloroallyl diisobutylthiolcarbamate
3-chloroallyl-1-pyrrolidinecarbothioate
2-chloroallyl-1-pyrrolidinecarbothioate
3-chloro-2-butenyl-1-pyrrolidinecarbothioate
cis- and trans-2,3-dichloroallyl diallylthiolcarbamate
2-bromoallyl diisopropylthiolcarbamate
2-bromoallyl diallylthiolcarbamate
2-bromoallyl N-(2-chloroallyl)isopropylthiolcarbamate
allyl N-(2-chloroallyl)isopropylthiolcarbamate
allyl N-(2-chloroallyl)-3-methoxypropylthiolcarbamate
allyl N-(β-cyanoethyl)-N-isopropylthiolcarbamate
allyl N-(allyl)isopropylthiolcarbamate
allyl diisopropylthiolcarbamate
allyl diallylthiolcarbamate
allyl dibutylthiolcarbamate
cis- and trans-2,3-dichloroallyl N-(allyl)isopropylthiolcarbamate
cis- and trans-2,3-dichloroallyl N-(2-chloroallyl)isopropylthiolcarbamate allyl 4-phenyl-1-piperazinecarbothioate
3-chloro-2-fluoroallyl diisopropylthiolcarbamate
2-bromoallyl allylisopropylthiolcarbamate
2-bromoallyl 4-phenyl-1-piperazinecarbothioate
trans-2,3-dichloroallyl diethylthiolcarbamate
cis-2,3-dichloroallyl diethylthiolcarbamate
3,3-dichloroallyl diisopropylthiolcarbamate
trans-2,3-dichloro-2-butenyl diisopropylthiolcarbamate
trans-2,3-dichloro-2-butenyl diethylthiolcarbamate
2-chloroallyl bis(2-methoxyethyl)thiolcarbamate
allyl bis(2-methoxyethyl)thiolcarbamate
3,3-dichloroallyl bis(2-methoxyethyl)thiolcarbamate
2-chloroallyl bis(2-methoxypropyl)thiolcarbamate
3,3-dichloroallyl 1-pyrrolidinecarbothioate
allyl 1-pyrrolidinecarbothioate
allyl 1-piperidinecarbothioate
2-chloroallyl 1-piperidinecarbothioate
3,3-dichloroallyl 1-piperidinecarbothioate
3-chloro-2-butenyl 1-piperidinecarbothioate
2-chloroallyl 2-methyl-1-piperidinecarbothioate
2-chloroallyl bis(2-phenoxyethyl)thiolcarbamate
2-chloroallyl N-2-phenoxyethyl-N-ethylthiolcarbamate
2-chloroallyl bis(2-benzyloxyethyl)thiolcarbamate
2-chloroallyl N-2-benzyloxyethyl-N-ethylthiolcarbamate
2-chloroallyl N-cyclohexyl-N-ethylthiolcarbamate
vinyl dibutylthiolcarbamate
methallyl diethylthiolcarbamate
2-cyclohexenyl diethylthiolcarbamate
2-chloroallyl-5-ethyl-3-methyl-1-piperidinecarbothioate
2-chloroallyl N-(methyl)cyclohexenylthiolcarbamate It will be noted that the examples illustrate compounds in which the amino substituent R of the general formula contains 2 to 18 carbon atoms, inclusive, and that these amino substituents include saturated monoamino-hydrocarbon radicals of 2 to 8 carbon atoms, bis(hydrocarbonoxyloweralkyl)amino in which any unsaturation is aromatic, bis(lower 2-alkenyl)amino and unsymmetrically disubstituted amino where one substituent is selected from a group consisting of lower 2-alkenyl, chlorolower-2-alkenyl, cyanoloweralkyl, hydrocarbonoxyloweralkyl in which any unsaturation is aromatic and cyclohexenyl and the other is a different member of the group consisting of loweralkyl and hydrocarbonoxyloweralkyl in which any unsaturation is aromatic.

Further examples of biologically active thiolcarbamates comprise the following:

cis- and trans-2,3-dichloroallyl 5-ethyl-2-methyl-piperidinocarbothiolate
cis- and trans-2,3-dichloroallyl N-butyl N-cyclohexylthiolcarbamate
cis- and trans-2,3-dichloroallyl N-cyclohexyl-N-allyl-thiolcarbamate
2,3,3-trichloroallyl N-cyclohexyl-N-isopropylthiolcarbamate
cis- and trans-2,3-dichloroallyl N-ethyl-N-(4-methylcyclohexyl)-thiolcarbamate
2,3,3-trichloroallyl dimethoxypropylthiolcarbamate
2,3,3-trichloroallyl dibutylthiolcarbamate
2,3,3-trichloroallyl 1-pyrrolidinecarbothiolate
2,3,3-trichloroallyl N-tetrahydrofurfuryl N-propylthiolcarbamate
2,3,3-trichloroallyl N-tetrahydrofurfuryl N-ethylthiolcarbamate
2,3,3-trichloroallyl N-furfuryl-N-methylthiolcarbamate
2,3,3-trichloroallyl diisobutylthiolcarbamate
3,4,4-trifluoro-3-butenyl diisopropylthiolcarbamate
cis- and trans-2,3-dichloroallyl-4-morpholinecarbothiolate
cis- and trans-2,3-dichloroallyl N-(2-cyanoethyl)-N-isopropylthiolcarbamate
cis- and trans-2,3-dichloroallyl N-(2-phenoxyethyl)-N-methylthiolcarbamate
cis- and trans-2,3-dichloroallyl N-2-benzyloxyethyl-N-methylthiolcarbamate
cis- and trans-2,3-dichloroallyl N-dodecyl-N-methyl-thiolcarbamate
cis- and trans-2,3-dichloroallyl N-octyl-N-methyl-thiolcarbamate
cis- and trans-2,3-dichloroallyl N-methyl-N-cyclopentylthiolcarbamate
cis- and trans-2,3-dichloroallyl N-methyl-N-cyclooctylthiolcarbamate
cis- and trans-2,3-dichloroallyl 1-hexamethyleniminecarbothiolate
2,3,3-trichloroallyl 1-hexamethyleniminecarbothiolate
cis- and trans-2,3-dichloroallyl di(ethoxyethyl) thiolcarbamate The phytotoxic esters of thiolcarbamic acids comprise weed killers having both pre-emergence and post-emergence activity. Accordingly, by applying the toxicant to the plant is means any means whereby the toxicant is brought into contact with living plants which latter include germinating seedlings, as for example by application to the ground before the plants emerge or by direct application to the foliage. The thiolcarbamate herbicides are effective against a wide variety of plants including grasses and broadleaved plants. Some of them are outstanding grass specific pre-emergence herbicides. They also include defoliants and nematocides.

The discovery of compounds toxic to broadleaf plants but relatively innocuous to grasses has created considerable demand for compounds to destroy undesired grasses. It is therefore significant that thiolcarbamates were discovered which possess this property. Outstanding examples comprise 2-chloroallyl dimethyl-thiolcarbamate, cis- and trans-2,3-dichloroallyl dimethylthiolcarbamate, cis- and trans-2,3-dichloroallyl diethylthiolcarbamate, 2-bromoallyl diethylthiolcarbamate, 3,3-dichloroallyl diethylthiolcarbamate, 2-chloroallyl diethylthiolcarbamate, 3,3-dichloroallyl dimethylthiolcarbamate, and allyl diethylthiolcarbamate.

The new toxicants may be applied conveniently in the form of a spray containing the active ingredient in a concentration within the range of 0.1%–10.0% by weight. Thorough coverage of the foliage is effective for contact killing. For pre-emergence control of grasses, amounts within the range of ¼–60 pounds per acre have been used successfully. Examples of grasses which are controlled are foxtail, cheat grass, wild oats, rye grass, and crab grass. Weeds from the following plant families are controlled to varying degrees: Leguminaseae, Cucurbitaceae, Umbellifereae, Chenopodiaceae, Amarenthaceae, Convolvulaceae, and Aizoaceae. At concentrations within the range of 35–100 pounds per acre the new compounds are soil sterilants and destroy all plant life as well as destroying some animal pests.

Although most thiolcarbamates are insoluble in water, they are soluble in organic solvents. Most of them are soluble in acetone, chloroform, ethyl alcohol, ethyl acetate, benzene, ether, and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents.

The tables below illustrate characteristic herbicidal activity of typical thiolcarbamates. The toxicant was emulsified in water and the emulsion applied as a spray. In the foliage application the spray containing the concentration of the active ingredient shown in the table was applied to the foliage of grass and to the foliage of bean plants and finally to the foliage of a mixture of broad-leaved plants and the effect recorded. In the pre-emergence application the spray was applied to the ground of seeded plots before the grass or other plants emerged. The following phytotoxicity rating key was used:

|  | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 | --- |
| Defoliation | B | --- |

As these data indicate, the new compounds are used most effectively as pre-emergence herbicides. Of course, the foregoing examples are merely illustrative of esters that may be used.

As explained above and as will be hereinafter illustrated in greater detail, the substituents which are attached to the nitrogen of the

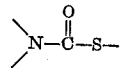

nucleus can be varied considerably. While the relationship between biological activity and structure is, to say the least, obscure, some generalities derived from study of a large number of different structures appear to be valid.

TABLE I.—CONTACT

| Toxicant | Conc., Percent | Phytotoxicity Rating | | |
|---|---|---|---|---|
| | | Grass | Bean | Broad-leaf |
| 1. 2-chloroallyl dimethyl thiolcarbamate | 0.5 | 2 | 1 | 1+ |
| 2. cis- and trans-2,3-dichloroallyl dimethylthiolcarbamate | 0.5 | 3 | 1 | 2 |
| 3. 3,3-dichloroallyl diethylthiolcarbamate | 0.5 | 3+ | 1+ | 3+ |
|  | 0.2 | 3 | --- | 1 |
| 4. 2-chloroallyl diethylthiolcarbamate | 0.5 | 3 | 1+ | 2+ |
| 5. cis- and trans-2,3-dichloroallyl diethylthiolcarbamate | 0.5 | 3 | 2 | 1+ |
| 6. 2-bromoallyl diethylthiolcarbamate | 0.5 | 3+ | 1 | 1 |
| 7. 3,3-dichloroallyl dimethylthiolcarbamate | 0.5 | 1 | 1 | 2 |

The plants employed in the pre-emergence application are designated by letter in Table II. The plants corresponding to the letters are as follows:

A—wild oat  
B—brome grass  
C—rye grass (domestic)  
D—buckwheat  
E—mustard (radish)  
F—red clover  
G—sugar beet  
H—cotton  
J—cucumber  
K—corn  
L—foxtail  
M—barnyard grass  
N—crab grass  
O—field bindweed  
P—Russian thistle  
Q—pigweed  
R—wild morning glory The presence of hydrogen on the nitrogen affects activity profoundly. The compounds contemplated here have no hydrogen attached to the nitrogen. Aryl groups as for example phenyl, alicyclic groups as for example cyclohexyl, and aralkyl groups as for example benzyl, are less desirable and in any event not more than one radical should be selected from these types. Unsaturated radicals are desirable nitrogen substituents, as for example cyclohexenyl, alkenyl, and halogen-substituted alkenyl. More than one halogen-substituted alkenyl group including the ester substituent does not usually increase biological ac-

TABLE II.—PRE-EMERGENCE

| Toxicant No. | Rate, Lbs. per Acre | A | B | C | D | E | F | G | H | J | K | L | M | N | O | P | Q | R |
|---|---|---|---|---|---|---|---|---|---|---|---|---|---|---|---|---|---|---|
| 1 | 25 | 3 | 3 | 3 | 3 | 2 | 2 | 0 | 2 | 3 | 0 | 3 | --- | --- | --- | --- | --- | --- |
|  | 5 | 1 | 2 | 3 | 0 | 0 | 1 | 0 | 0 | 0 | 0 | 1 | --- | --- | --- | --- | --- | --- |
|  | 2.5 | 0 | 0 | 3 | 1 | 0 | 0 | 0 | 0 | 1 | 0 | 2 | --- | --- | --- | --- | --- | --- |
|  | 1 | 0 | 3 | 1 | 0 | 0 | --- | 0 | 0 | --- | 0 | 1 | --- | --- | --- | --- | --- | --- |
| 2 | 25 | 3 | 3 | 3 | 3 | 0 | 1 | 1 | 0 | --- | 2 | 3 | --- | --- | --- | --- | --- | --- |
|  | 10 | 3 | 3 | 3 | 3 | 0 | 1 | 0 | 2 | --- | 3 | 3 | --- | --- | --- | --- | --- | --- |
|  | 5 | 3 | 2 | 2 | 3 | 0 | 0 | 0 | 1 | --- | 0 | 3 | --- | --- | --- | --- | --- | --- |
|  | 2.5 | 0 | 2 | 2 | 3 | 0 | 0 | 0 | 0 | --- | 0 | 1 | --- | --- | --- | --- | --- | --- |
| 3 | 25 | 3 | 3 | 3 | --- | 0 | --- | 0 | 0 | --- | 0 | 3 | 3 | 3 | 0 | 2 | 0 | 1 |
|  | 5 | 3 | 3 | 3 | --- | 0 | --- | 0 | 0 | --- | 0 | 3 | 3 | 3 | 0 | 2 | 0 | 0 |
|  | 2.5 | 3 | 3 | 3 | --- | 2 | --- | 0 | 0 | --- | 0 | 3 | 3 | 3 | 0 | 3 | 0 | 1 |
|  | 1 | 3 | 3 | 3 | --- | 0 | --- | 0 | 0 | --- | 0 | 1 | 0 | 2 | 0 | 0 | 0 | 1 |
| 4 | 25 | 3 | 3 | 3 | --- | 1 | --- | 0 | 1 | --- | 0 | 3 | 3 | 3 | 1 | 1 | 3 | 1 |
|  | 5 | 3 | 3 | 3 | --- | 1 | --- | 0 | 0 | --- | 0 | 3 | 3 | 3 | 0 | 3 | 0 | 1 |
|  | 2.5 | 3 | 3 | 3 | --- | 0 | --- | 0 | 0 | --- | 0 | 3 | 3 | 3 | 0 | 0 | 0 | 0 |
|  | 1 | 3 | 3 | 3 | --- | 0 | --- | 0 | 0 | --- | 0 | 3 | 3 | 2 | 1 | 1 | 0 | 2 |
| 5 | 25 | 3 | 3 | 3 | --- | 2 | --- | 0 | 1 | --- | 0 | 3 | 3 | 3 | 0 | --- | 3 | 1 |
|  | 5 | 3 | 3 | 3 | --- | 0 | --- | 2 | 0 | --- | 0 | 3 | 3 | 3 | 1 | --- | 1 | 1 |
|  | 1 | 3 | 3 | 3 | --- | 0 | --- | 0 | 0 | --- | 0 | 3 | 1 | 3 | 1 | --- | 0 | 3 |
| 6 | 25 | 3 | 3 | 3 | --- | 1 | --- | 0 | 1 | --- | 0 | 3 | 3 | 3 | 0 | --- | 3 | 3 |
|  | 5 | 3 | 3 | 3 | --- | 1 | --- | 0 | 0 | --- | 0 | 3 | 3 | 3 | 0 | --- | 0 | 2 |
|  | 1 | 2 | 3 | 3 | --- | 1 | --- | 0 | 0 | --- | 0 | 2 | 3 | 2 | 0 | --- | 0 | 0 |
| 7 | 25 | 3 | 3 | 3 | 3 | 2 | --- | 3 | 0 | --- | 0 | 3 | 3 | 3 | 3 | --- | 0 | 0 |
| 8 a | 25 | 3 | 3 | 3 | --- | 0 | --- | 0 | 1 | --- | 0 | 3 | 3 | 3 | 0 | --- | 0 | 0 |
|  | 5 | 2 | 3 | 3 | --- | 1 | --- | 0 | 1 | --- | 0 | 1 | 0 | 3 | 1 | --- | 0 | 0 |
| 9 b | 25 | 1 | 2 | 0 | 0 | 0 | 1 | 3 | 1 | 3 | 2 | 1 | --- | --- | --- | --- | --- | --- | a Allyl diethylthiolcarbamate.  
b Allyl dimethylthiolcarbamate.

tivity. In other words, if the ester radical is halogen-substituted alkenyl, the presence of a second radical of this type would not be expected to increase the effectiveness. Similarly, with an unsubstituted-alkenyl radical as the ester substituent and a halogen-substituted alkenyl group attached to nitrogen, the second nitrogen substituent should preferably not be halogen-substituted alkenyl.

While the alkyl thiolcarbamates examined had only a low order of activity, the unsaturated esters proved to be very valuable compounds. Cyclic groups as for example cyclohexenyl are desirable but aromatic esters are not included. Thiazolyl esters, as for example 5-acetyl-4-methyl-2-thiazolyl diethylthiolcarbamate, are useful, these compounds being characterized by contact phytotoxicity to broadleaves.

The invention relates to plurally halogenated unsaturated thiolcarbamates. More particularly, it relates to methods of destroying or controlling undesired vegetation which comprises applying thereto a toxic plurally halogenated unsaturated ester of a thiolcarbamic acid.

The biologically active compounds conform to the structure

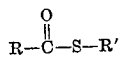

where R is an organic amino substituent having the nitrogen atom connected directly to the carbon of the

and to two other carbon atoms and where R' represents a halogenated non-aromatic mono-unsaturated organic radical having more than one halogen substituent. Typical examples of R' comprise lower alkenyl as follows: cis- and trans-2,3-dichloro-2-butenyl, cis- and trans-2,3-di- chloroallyl, 2,3-diiodo-2-butenyl, 2-fluoro-3-chloroallyl, 2,3-dibromoallyl, 3,4,4-trifluoro-3-butenyl, and 2,3,3-trichloroallyl. Outstanding examples comprise, 2,3-dichloroallyl diisopropylthiolcarbamate, 2,3,3-trichloroallyl diethylthiolcarbamate, 2,3,3-trichloroallyl diisopropylthiolcarbamate, and cis- and trans-2,3-dichloroallyl N-methyl-N-cyclohexylthiolcarbamate.

The toxicants of the invention are for the most part mobile oils and may be applied full strength in the form of a spray but preferably in conjunction with a herbicidal adjuvant as carrier containing the active ingredient in a concentration within the range of about 0.1%–50.0% by weight. Although most thiolcarbamates are insoluble in water, they may be dispersed therein and applied as aqueous sprays. Most thiolcarbamates are soluble in acetone, chloroform, ethyl acetate, benzene, ether, and heptane. Petroleum fractions make satisfactory, economical herbicidal adjuvants and readily lend themselves to emulsification in water where that is desired. Thorough coverage of foliage is desirable for contact killing. For pre-emergent control of grasses, amounts within the range of ⅟₁₆–60 pounds per acre have been used successfully.

Whether applied in conjunction with a carrier or not, admixture with a small amount of an organic surface-active agent capable of lowering the surface tension of water is desirable for field application. Examples of surface-active agents variously known as dispersing agents, wetting agents, or emulsifying agents comprise morpholine or dimethylamine oleate, sulfonated fish, castor, and petroleum oils, sodium salt of lignin sulfonic acid, butyl or other amine salt of decyl or dodecylbenzene sulfonic acid, sodium lauryl sulfate, disodium monolauryl phosphate, ethylene oxide condensation products of higher alcohols or higher mercaptans. Mixtures of two or more surface-active agents are also feasible. Generally, the surface-active agent will comprise only a small proportion of the composition, say 0.1–15% by weight of the ester. Solutions of the esters in organic solvents containing small amounts of surface-active agent provide versatile herbicidal compositions useful either for direct application to foliage and soil or for preparing aqueous sprays. A suitable formulation comprises 45 parts by weight heavy aromatic naphtha, 5 parts by weight organic surface-active agent, and 50 parts by weight ester toxicant.

The formulation of dry compositions for application as dusts or for further dilution with liquid carriers is readily accomplished by mixing the ester with a finely divided carrier. The latter will usually be in major proportions. Suitable carriers comprise talc, clay, pyrophyllite, silica, fuller's earth, diatomaceous earth, and flours such as walnut shell, wheat, soya bean and cottonseed flours. Magnesium or calcium carbonate and calcium phosphate are suitable solid carriers. Adsorption on inert granules such as granular forms of fuller's earth provide effective forms more convenient to apply and use than dusts.

As illustrative of the herbicidal activity the ester was dissolved in a relatively high volume of volatile organic solvent and applied as a spray. In the foliage application the spray containing the active ingredient was applied to the foliage of grass and to the foliage of bean plants and finally to the foliage of a mixture of broadleaved plants and the effect recorded. In the pre-emergence application a counted number of seeds of various grasses and broadleaf plants were scattered on the soil surface and covered with soil. The soil was then sprayed with the volatile organic solvent containing the test chemical. About fourteen days after application of the toxicants, results were observed and recorded. The number of seeds emerging was converted to weighted herbicidal ratings based on average percent germination of any particular seed lot times an injury factor. This evened irregularities of ratings on seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Phytotoxicity rating: | Percent emergence |
|---|---|
| 3 or severe | 0–25 |
| 2 or moderate | 26–50 |
| 1 or slight | 51–75 |
| 0 or none | 76–100 |

TABLE III.—CONTACT

| Toxicant | Conc., percent | Phytotoxicity Rating | | |
|---|---|---|---|---|
| | | Grass | Bean | Broadleaf |
| 10. cis- and trans-2,3-dichloroallyl diisopropylthiolcarbamate | 0.5 | 3 | 1 | 1 |
| 11. trans-2,3-dichloroallyl diisopropylthiolcarbamate | 0.5 | 3 | 1 | 0 |
| 12. cis-2,3-dichloroallyl diisopropylthiolcarbamate | 0.5 | 3 | 0 | 0 |
| 13. cis- and trans-2,3-dichloroallyl 5-ethyl-2-methyl-piperidinecarbothiolate | 0.5 | 1 | 1 | 1 |
| 14. cis- and trans-2,3-dichloroallyl N-2-chloroallyl N-isopropylthiolcarbamate | 0.5 | 2 | 2 | 2 |

The plants employed in the pre-emergence application are designated by letter in Table IV. The plants corresponding to the letters are as follows:

A—wild oat
B—brome grass
C—rye grass (domestic)
D—buckwheat
E—mustard (radish)
F—sugar beet
G—cotton
H—corn
J—foxtail
K—barnyard grass
L—crab grass
M—field bindweed
N—Russian thistle
O—pigweed
P—wild morning glory No. 18—2,3,3-trichloroallyl diallylthiolcarbamate
No. 19—2,3,3-trichloroallyl dipropylthiolcarbamate
No. 20—2,3,3-trichloroallyl N-cyclohexyl-N-ethyl-thiolcarbamate
No. 21—2,3,3-trichloroallyl dimethylthiolcarbamate.

The active ingredient was applied at a dosage of 25 pounds per acre to the soil of seeded plots before the grass or other plants emerged. The letters and the numerical symbols have the same significance as in the preceding tables.

TABLE IV.—PRE-EMERGENCE

| Toxicant No. | Rate, Lbs. per Acre | A | B | C | D | E | F | G | H | J | K | L | M | N | O | P |
|---|---|---|---|---|---|---|---|---|---|---|---|---|---|---|---|---|
| 10 | ¼ | 3 | 3 | 3 | ---- | 0 | 0 | ---- | ---- | 2 | 0 | ---- | ---- | ---- | 0 | 0 |
|  | ⅛ | 2 | 2 | 2 | ---- | 0 | 0 | ---- | ---- | 0 | 0 | ---- | ---- | ---- | 0 | 0 |
| 11 | ¼ | 3 | 3 | 1 | ---- | 0 | 0 | ---- | 0 | 2 | ---- | 0 | ---- | ---- | 0 | 2 |
|  | ⅛ | 2 | 2 | 0 | ---- | 0 | 1 | ---- | ---- | 1 | ---- | 0 | ---- | ---- | 0 | 0 |
| 12 | ¼ | 3 | 3 | 3 | ---- | 0 | 0 | ---- | ---- | 3 | ---- | 2 | ---- | ---- | 0 | 0 |
|  | ⅛ | 1 | 3 | 3 | ---- | 0 | 3 | ---- | ---- | 1 | ---- | 0 | ---- | ---- | 0 | 0 |
| 13 | 25 | 3 | 0 | 3 | ---- | 0 | 0 | ---- | ---- | 3 | ---- | 3 | ---- | ---- | 3 | 2 |
| 14 | 25 | 3 | 3 | 3 | ---- | 3 | 2 | ---- | 3 | ---- | ---- | 3 | ---- | ---- | 3 | ---- |
| 15 [1] | 25 | 1 | 2 | 3 | ---- | 0 | 0 | ---- | 1 | ---- | ---- | 3 | ---- | ---- | 0 | ---- |
| 16 [2] | 25 | 3 | 2 | 3 | ---- | 1 | 3 | ---- | 3 | ---- | ---- | 3 | ---- | ---- | 3 | ---- |
| 17 [3] | 25 | 2 | 0 | 1 | ---- | 0 | 1 | ---- | 1 | ---- | ---- | 3 | ---- | ---- | 3 | ---- |

[1] cis- and trans-2,3-dichlorallyl N-ethylthiolcarbanilate.
[2] cis- and trans-2,3-dichloroallyl di(2-methoxyethyl)thiolcarbamate.
[3] bis(cis- and trans-2,3-dichloroallyl)-1,4-piperazinedicarbothiolate.

As these data indicate, the new toxicants are extremely effective, highly specific pre-emergent grass killers. The excellent wild-oat control is especially important in view of the magnitude of the wild-oat-control problem throughout the world. For elimination of this pest and the presence of more than one halogen is important as evidenced by the following comparative data:

|  | Toxicity to wild oats at surface application rate of— | |
|---|---|---|
|  | ½ pound per acre | ¼ pound per acre |
| 2-chloroallyl diisopropylthiolcarbamate | 1 | 1 |
| cis- and trans-2,3-dichloroallyl diisopropylthiolcarbamate | 3 | 3 |

Furthermore, incorporation into the top soil improves performance four- to eightfold. For example, cis- and trans-2,3-dichloroallyl diisopropylthiolcarbamate was mixed into the top layer of soil seeded to wild oats. At rates of ⅛ and 1⁄16 pound per acre, the phytotoxicity ratings were 3 and 2 respectively in the greenhouse. More extensive tests in the field were carried out at four different locations where wild oats were a serious problem. In every case this toxicant was 99%–100% effective against wild oats in pre-emergent application at 1½ pounds per acre when incorporated into the top soil at depths of 2–4 inches. At rates of four pounds per acre and above, this compound effectively controlled wild oats and some other weedy grasses when applied as a foliage spray to seedlings up to two weeks old. A high degree of effectiveness was coupled with a relatively large safety factor. Muskmelon, tomato, sugar beets, alfalfa, peas, turnip, cotton, soybeans, snapbeans, corn, flax, and barley were resistant to the toxicant. Wheat was resistant, too, but the safety factor was lower. While the toxicants are primarily grass-specific herbicides, pigweed, plantain and ragweed were fairly susceptible.

Table V further illustrates the pre-emergent herbicidal activity of other typical compounds. The toxicants employed were as follows:

TABLE V

| Toxicant No. | A | B | C | D | E | F | J | L | O | P |
|---|---|---|---|---|---|---|---|---|---|---|
| 18 | 3 | 2 | 3 | 2 | 0 | 2 | 3 | 3 | 3 | 0 |
| 19 | 3 | 3 | 3 | 2 | 2 | 2 | 3 | 3 | 3 | 3 |
| 20 | 3 | 2 | 3 | 1 | 0 | 1 | 3 | 3 | 2 | 2 |
| 21 | 0 | 3 | 3 | 0 | 0 | 0 | 3 | 3 | 1 | 0 |

Table VI illustrates pre-emergent herbicidal activity of typical compounds at five pounds per acre. The toxicants employed were:

No. 22—cis- and trans-2,3-dichloroallyl N-ethyl-N-cyclohexylthiolcarbamate
No. 23—cis- and trans-2,3-dichloroallyl N-methyl-N-cyclohexylthiolcarbamate
No. 24—cis- and trans-2,3-dichlorallyl N-cyclohexyl-N-propylthiolcarbamate
No. 25—cis- and trans-2,3-dichloroallyl N-cyclohexyl-N-isopropylthiolcarbamate
No. 26—cis- and trans-2,3-dichloroallyl N-ethyl-N-(2-methylcyclohexyl)thiolcarbamate
No. 27—2,3,3-trichloroallyl diethylthiolcarbamate
No. 28—2,3,3-trichlorallyl diisopropylthiolcarbamate
No. 29—2,3,3-trichloroallyl N-cyclohexyl-N-methyl-thiolcarbamate.

TABLE VI

| Toxicant No. | A | B | C | D | E | F | J | L | O | P |
|---|---|---|---|---|---|---|---|---|---|---|
| 22 | 3 | 3 | 3 | 0 | 0 | 1 | 3 | 3 | 3 | 0 |
| 23 | 3 | 3 | 3 | 1 | 0 | 0 | 3 | 3 | 3 | 0 |
| 24 | 3 | 0 | 3 | 0 | 0 | 0 | 3 | 3 | 1 | 0 |
| 25 | 3 | 0 | 3 | 0 | 0 | 1 | 3 | 3 | 3 | 0 |
| 26 | 3 | 3 | 3 | 1 | 0 | 0 | 3 | 3 | 1 | 0 |
| 27 | 3 | 3 | 3 | 0 | 0 | 0 | 3 | 3 | 3 | 0 |
| 28 | 3 | 3 | 3 | 0 | 0 | 0 | 3 | 3 | 2 | 0 |
| 29 | 3 | 2 | 3 | 0 | 0 | 0 | 3 | 3 | 0 | 0 |

Further to illustrate the increased effectiveness by incorporating the toxicant into the top soil, the toxicants listed in Table VI were mixed into the top layer of soil seeded to wild oats. At a rate of ½ pound per acre, the phytotoxicity rating was 3 in every case. At a rate of ⅛ pound per acre, the phytotoxicity rating was 3 for Toxicant No. 24 and Toxicant No. 29 was completely effective at 1/16 pound per acre.

As explained above, the compounds contemplated here have no hydrogen attached to the nitrogen of the thiolcarbamate nucleus. Aromatic radicals are in general less desirable than aliphatic radicals but one phenyl radical in conjunction with alkyl of one to three carbon atoms or allyl provides useful compounds providing halogen is contained in both the 2- and 3-positions of the ester radical. While two cyclohexyl substituents reduce effectiveness, one cyclohexyl in conjunction with an alkyl radical of one to three carbon atoms or allyl comprise a preferred group. Aralkyl groups, as for example benzyl, are suitable but not more than one radical should be selected from this type. Other unsaturated radicals are suitable especially in conjunction with lower acyclic hydrocarbon radicals, as for example cyclohexenyl and halogen-substituted alkenyl. More than one halogen-substituted radical is usually not beneficial. In other words, the presence of a second radical of this type on the nitrogen does not usually increase effectiveness. R in the general formula above includes 4-phenyl piperazinyl.

Controlling harmful and unwanted parasites present in the soil, such as nematodes, is an important problem of considerable complexity. Some of the new compounds are effective for this purpose, notably halogen-substituted alkenyl esters of dimethylthiolcarbamate, as for example 2-chloroallyl and 2,3-dichloroallyl dimethylthiolcarbamate. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

Nematocidal activity was demonstrated by preparing a suspension of the nematode Panagrellus redivivus in water and observing through a microscope the motility of the organisms in the presence of 0.1% of the test material. The nematode in aqueous suspension will flex its body at a regular rate and as the nematocide takes effect, the rate of flexing is decreased until death of the parasite occurs. In this experiment the control containing no added toxicant showed undiminished activity after 24 hours whereas complete destruction of the nematode was effected with 2-chloroallyl dimethylthiolcarbamate and 2,3-dichloroallyl dimethylthiolcarbamate. Although less effective, activity as contact nematocides was exhibited by 3,3-dichloroallyl diethylthiolcarbamate, 2,3-dichloroallyl diethylthiolcarbamate, 2-bromoallyl diethylthiolcarbamate, and allyl dimethylthiolcarbamate.

In another experiment sterilized soil was infested with nematodes (Meloidogyne sp) and different portions treated with solutions containing concentrations of 0.1% and 0.01% by weight of 2-chloroallyl dimethylthiolcarbamate. The treated soil was allowed to stand for a week, then two-week old tomato plants were transplanted in the test soil and also in untreated, heat-sterilized soil. The plants were allowed to grow for two months, then were harvested, the roots washed and examined for evidence of infection. Comparison to the untreated controls gave the phytotoxicity of the compound. The results showed no nematode infestation and no phytotoxicity in both the untreated and treated soils.

The nematocidal compositions attack the soil phase of the life cycle of nematode parasites which infest animals. Treating barnyards, chicken pens, stables, and other infested areas destroys eggs and infective larvae of many parasites which infest animals. Moreover, the compositions are effective for the control of nematodes in their environment which includes bodies of animals. They are toxic to other worms such as flukes and tapeworms.

In the use of 2-chloroallyl dimethylthiolcarbamate as a nematocide or soil fumigant, the active compound, diluted or undiluted, may be applied to the soil at rates of 10 to 500 pounds per acre. The preferred application for treating soils of average nematode infestation will be from 25 to 100 pounds per acre. Formulation may contain dispersants which aid uniform distribution.

The new compounds are also useful for preventing tarnish of worn silverplate. Synthetic detergents used for hand dishwashing require a tarnish inhibitor. Otherwise, utensils with worn silverplate will acquire a dark brown tarnish.

Tarnish inhibition was demonstrated by the following procedure: Specimens of German silver (nickel silver) were polished with crocus cloth until all stains had been removed and the surfaces were bright and smooth. The method of J. C. Harris et al., ASTM Bulletin No. 204, February 1955, page 32, was followed for degreasing, cleaning, and storage of specimens. Stock solutions of the detergents and inhibitors were mixed and diluted to the specified concentrations. Each metal specimen was placed in a 100 ml. beaker containing 50 ml. of detergent and inhibitor solution. A control containing no inhibitor was observed for tarnish and discoloration.

The tests were carried out employing as the detergent ammonium dodecylbenzenesulfonate at 0.1% concentration. After 24 hours observations were made as to the presence or absence of tarnish. In the table are recorded observations made in which 2-chloroallyl dimethylthiolcarbamate was employed as the inhibitor:

TABLE VII

| Concentration percent of detergent solids: | Observation after 24 hours |
|---|---|
| None | Visible tarnish. |
| 0.2 | No visible tarnish. |
| 0.1 | Do. |

It is intended to cover all changes and modifications of the examples of the invention herein chosen for purposes of disclosure which do not constitute departures from the spirit and scope of the invention.

What is claimed is:

1. A herbicidal composition comprising a major proportion of a relatively inert herbicidal adjuvant as carrier and a minor herbicidally effective proportion of a phytotoxic ester having the structure

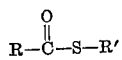

where R represents an organic acyclic or cyclic amino substituent of 2 to 18 carbon atoms, inclusive, having the nitrogen atom directly connected to the carbonyl group and to two other carbon atoms, both of which carbon atoms are saturated, any unsaturation present being doubly bonded carbon to carbon, and where R' represents a non-aromatic, non-acetylenic organic radical of not more than 6 carbon atoms containing one carbon-to-carbon double bond.

2. A herbicidal composition comprising a major proportion of a relatively inert herbicidal adjuvant as carrier and a minor herbicidally effective proportion of a phytotoxic ester having the structure

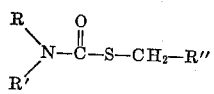

where R and R' represent non-acetylenic acyclic hydrocarbon containing less than five carbon atoms in each and R" represents halogen-substituted vinyl.

3. A herbicidal composition comprising a major proportion of a relatively inert herbicidal adjuvant as carrier and a minor but herbicidally effective proportion of a phytotoxic ester having the structure

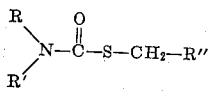

where R and R' represent lower alkyl and R" represents halogen-substituted vinyl.

4. A herbicidal composition comprising a major proportion of a relatively inert herbicidal adjuvant as carrier and a minor but herbicidally effective proportion of 2,3-dichloroallyl diethylthiolcarbamate.

5. A herbicidal composition comprising a major proportion of a relatively inert herbicidal adjuvant as carrier and a minor but herbicidally effective proportion of 2-chloroallyl diethylthiolcarbamate.

6. A herbicidal composition comprising a major proportion of a relatively inert herbicidal adjuvant as carrier and a minor but herbicidally effective proportion of 3,3-dichloroallyl diethylthiolcarbamate.

7. A herbicidal composition comprising a major proportion of a relatively inert herbicidal adjuvant as carrier and a minor but herbicidally effective proportion of 2,3-dichloroallyl diisopropylthiolcarbamate.

8. A herbicidal composition comprising an organic solvent carrier, an organic surface-active agent capable of lowering the surface tension of water and a phytotoxic ester having the structure

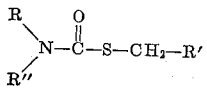

where R and R" represent non-acetylenic acyclic hydrocarbon containing less than five carbon atoms in each and R' represents trihalovinyl.

9. A herbicidal composition comprising an organic solvent carrier, an organic surface-active agent capable of lowering the surface tension of water and a phytotoxic ester having the structure

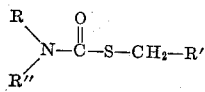

where R and R" represent lower alkyl and R' represents trihalovinyl.

10. A herbicidal composition comprising a solution in aromatic petroleum naphtha of 2,3,3-trichloroallyl diisopropylthiolcarbamate and a small amount of an organic surface-active agent capable of lowering the surface tension of water.

11. The method of controlling vegetation which comprises applying thereto a toxic concentration of a phytotoxic ester having the structure

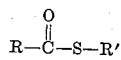

where R represents an organic acyclic or cyclic amino substituent of 2 to 18 carbon atoms, inclusive, having the nitrogen atom directly connected to the carbonyl group and to two other carbon atoms, both of which carbon atoms are saturated, any unsaturation present being doubly bonded carbon to carbon, and where R' represents a non-aromatic, non-acetylenic organic radical of not more than 6 carbon atoms containing one carbon-to-carbon double bond.

12. The method of claim 11 in which the toxicant is applied to the ground before the plants emerge.

13. The method of controlling vegetation which comprises applying thereto a toxic concentration of a phytotoxic ester having the structure

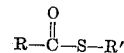

where R represents an organic amino substituent of 2 to 18 carbon atoms, inclusive, having the nitrogen atom directly connected to the carbonyl group and to two other carbon atoms and is selected from the group consisting of
saturated monaminohydrocarbon of 2 to 8 carbon atoms, inclusive,
morpholino,
N-phenylpiperazino,
bis(hydocarbonoxyloweralkyl)amino in which any unsaturation is aromatic,
bis(lower-2-alkenyl)amino,
bis(chlorolower-2-alkenyl)amino, and
unsymmetrically disubstituted amino where one substituent is selected from the group consisting of
lower-2-alkenyl,
chlorolower-2-alkenyl,
cyanoloweralkyl,
hydrocarbonoxyloweralkyl in which any unsaturation is aromatic,
phenyl,
benzyl, and
cyclohexenyl,
and the other is a different member of a group consisting of
lower alkyl and
hydrocarbonoxyloweralkyl in which any unsaturation is aromatic,
and R' represents an unsaturated radical selected from the group consisting of
lower alkenyl,
halogen-substituted lower alkenyl,
cyclohexenyl, and
5-acetyl-4-methylthiazolyl.

14. The method of controlling vegetation which comprises applying thereto a toxic concentration of a phytotoxic ester having the structure

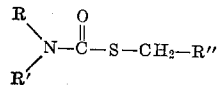

where R and R' represent non-acetylenic acyclic hydocarbon containing less than five carbon atoms in each and R" represents halogen-substituted vinyl.

15. The method of controlling vegetation which comprises anpplying thereto a toxic concentration of a phytotoxic ester having the structure

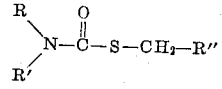

where R and R' represent lower alkyl and R" represents halogen-substituted vinyl.

16. The method of controlling vegetation which comprises applying thereto a toxic concentration of 2,3-dichloroallyl diethylthiolcarbamate.

17. The method of controlling vegetation which comprises applying thereto a toxic concentration of 2-chloroallyl diethylthiolcarbamate.

18. The method of controlling vegetation which comprises applying thereto a toxic concentration of 3,3-dichloroallyl diethylthiolcarbamate.

19. The method of controlling vegetation which comprises pre-emergent application thereto of a toxic concentration of 2-chloroallyl dimethylthiolcarbamate.

20. The method of controlling wild oats which comprises the pre-emergent application to soil infested with wild oats of a phytotoxic concentration of an ester having the structure

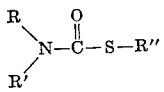

where R and R' represent alkyl containing at least 2 but not more than 3 carbon atoms in each and R'' represents dihalogen-substituted allyl.

21. The method of controlling wild oats which comprises the pre-emergent application to soil infested with wild oats of a phototoxic concentration of 2,3-dichloroallyl diisopropylthiolcarbamate.

22. The method of controlling vegetation which comprises applying thereto a phytotoxic concentration of an ester having the structure.

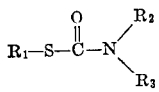

where $R_1$ is the allyl radical and $R_2$ and $R_3$ are selected from the group consisting of allyl radicals, monochloroallyl radicals and lower alkyl radicals.

23. The method of controlling vegetation which comprises applying thereto a phytotoxic concentration of an ester having the structure

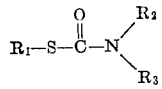

where $R_1$ is a monochloroallyl radical and $R_2$ and $R_3$ are selected from the group consisting of allyl and lower alkyl radicals.

24. The method of controlling vegetation which comprises applying thereto a phytotoxic concentration of methallyl diethylthiolcarbamate.

25. The method of controlling vegetation which comprises applying thereto a phytotoxic concentration of 5-acetyl-4-methyl-2-thiazolyl diethylthiolcarbamate.

26. The method of controlling vegetation which comprises applying thereto a toxic concentration of a phytotoxic ester having the structure

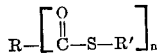

where R represents an organic amino radical having a nitrogen directly connected to the carbonyl radical and selected from the group consisting of five-membered heterocyclic monoamino hydrocarbon radicals; six-membered heterocyclic monoamino hydrocarbon radicals, morpholinyl, piperazinyl, 4-phenyl piperazinyl, hexamethyleneimino,

where R'' and R''' are selected from the group consisting of lower alkyl, lower 2-alkenyl, lower alkoxy-lower alkyl, benzyloxy-lower alkyl, phenoxy lower alkyl and cyano-lower alkyl,

where $R^{iv}$ is selected from the group consisting of cyclopentyl, cyclohexyl, methylcyclohexyl, cyclohexenyl, cyclooctyl and phenyl, $R^v$ is selected from the group consisting of alkyl of 1-3 carbon atoms, inclusive, and allyl,

where $R^{vi}$ is selected from the group consisting of chloro lower-2-alkenyl, tetrahydrofurfuryl, furfuryl, octyl and dodecyl, and $R^{vii}$ is lower alkyl, R' represents lower trihalo-monoolefinic and n is an integer equal to the valence of R.

27. The method of claim 26 in which the toxicant is applied to the ground before the plants emerge.

28. The method of controlling vegetation which comprises applying thereto a toxic concentration of a phytotoxic ester having the structure

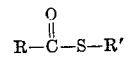

where R represents

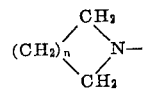

where n is an integer at least two but less than five and R' represents lower trihalo-monoolefinic.

29. The method of controlling vegetation which comprises applying thereto a toxic concentration of a phytotoxic ester having the structure

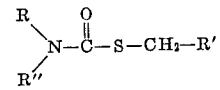

where R and R'' represent non-acetylenic acyclic hydrocarbon containing less than five carbon atoms in each and R' represents trihalovinyl.

30. The method of controlling vegetation which comprises applying thereto a toxic concentration of a phytotoxic ester having the structure

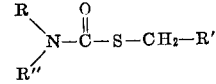

where R and R'' represent lower alkyl and R' represents trihalovinyl.

31. The method of controlling vegetation which comprises applying thereto a toxic concentration of 2,3,3-trichloroallyl diisopropylthiolcarbamate.

32. The method of controlling vegetation which comprises applying thereto a toxic concentration of 2,3,3-trichloroallyl 1-hexamethyleneiminecarbothiolate.

33. The method of controlling wild oats which comprises the pre-emergent application to soil infested with wild oats a phytotoxic concentration of 2,3,3-trichloroallyl diisopropylthiolcarbamate.

References Cited

UNITED STATES PATENTS

| | | | |
|---|---|---|---|
| 2,060,733 | 11/1936 | Hunt et al. | |
| 2,160,880 | 6/1939 | Loane et al. | |
| 2,384,074 | 9/1945 | Chenicek. | |
| 2,631,935 | 3/1953 | Baumgartner | 71—2.3 |
| 2,744,898 | 5/1956 | Harman et al. | |
| 2,992,091 | 7/1961 | Harman et al. | 71—2.6 |
| 3,066,020 | 11/1962 | Tilles et al. | 71—2.5 |
| 3,224,864 | 12/1965 | Hamm et al. | 71—2.5 |

LEWIS GOTTS, *Primary Examiner.*

JAMES O. THOMAS, JR., *Examiner.*